United States Patent
Gaubatz

(10) Patent No.: US 6,704,517 B1
(45) Date of Patent: Mar. 9, 2004

(54) BI-DIRECTIONAL DISPERSION COMPENSATOR

(75) Inventor: Ulrich Gaubatz, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/601,915

(22) PCT Filed: Feb. 4, 1999

(86) PCT No.: PCT/DE99/00304

§ 371 (c)(1),
(2), (4) Date: Aug. 9, 2000

(87) PCT Pub. No.: WO99/42874

PCT Pub. Date: Aug. 26, 1999

(30) Foreign Application Priority Data

Feb. 17, 1998 (DE) .......................... 198 06 584

(51) Int. Cl.$^7$ .............................. H04B 10/00
(52) U.S. Cl. .................. 398/147; 398/141; 398/148; 398/158; 398/159; 398/41; 398/42; 398/79; 398/81; 398/82; 398/84; 398/85; 398/87; 398/160; 398/178; 398/173

(58) Field of Search ................. 398/147, 141, 398/148, 41, 158, 42, 159, 81, 79, 82, 84, 85, 87, 178, 160, 173; 385/24, 37

(56) References Cited

U.S. PATENT DOCUMENTS

| | | | | |
|---|---|---|---|---|
| 5,596,448 A | * | 1/1997 | Onaka et al. | ................ 359/341 |
| 6,157,477 A | * | 12/2000 | Robinson | .................... 359/161 |
| 6,480,312 B1 | * | 11/2002 | Okuno et al. | ................ 359/161 |

* cited by examiner

*Primary Examiner*—Jason Chan
*Assistant Examiner*—Hanh Phan
(74) *Attorney, Agent, or Firm*—Bell Boyd & Lloyd LLC

(57) ABSTRACT

The bidirectional dispersion compensator comprises at least one circulator (Z,Z1,Z2,Z4) and at least one filter-coupler element (F1, etc.). The optical signals (S1,S2) that are emitted in opposite directions are merged and sent to a compensation fiber (LK,LK1, etc.) together, are reflected at the ends of this fiber, and are forwarded in the respective directions of transmission as dispersion-compensated optical signals (SK1 and SK2).

16 Claims, 4 Drawing Sheets

BI-DIRECTIONAL DISPERSION COMPENSATOR

This application is a 371 of PCT/DE99/00304 filed on Feb. 4, 1999.

BACKGROUND OF THE INVENTION

1. Field of the Invention

The invention relates to a bidirectional dispersion compensator for two optical signals that are transmitted over an optical fiber in opposite directions.

2. Description of the Related Art

In the transmission of signals with broad wavelength bands, it has been noted that the transmission speed depends on the wavelength. The compensation of this effect, which is termed dispersion, is an absolute technical condition for achieving acceptable transmission characteristics for systems with data rates of 10 Gbit/s and greater. Currently, there are several possibilities for compensation: compensation fibers, fiber-BRAGG grids, or optical phase conjugation.

Special glass fibers are used as compensation fibers, the total dispersion of which is exactly as great as that of the transmission paths being compensated, but which have an inverted operational sign. These types of compensators are expensive and require voluminous system components; in addition, a significant polarization mode dispersion arises. The effect of this is that orthogonal polarization states comprise different transit times through the compensation fibers.

The U.S. Pat. No. 5,596,448 teaches a dispersion compensator 10 as represented in FIG. 1, which this utilizes a compensation fiber that is provided with a reflector, which fiber is traversed twice by optical signals that are to be compensated. The length of this compensation fiber is halved, and thus the costs and volume are appreciably reduced. Besides the compensation line (compensation fiber) LK and the reflector R, the dispersion compensator contains a circulator Z, which delivers the optical signal that enters at terminal Z.1 (TOR 1) at the next terminal, terminal Z.2, and in turn delivers at terminal Z.3 the reflected compensated signal that is fed in at terminal Z.2.

When the reflector is constructed as a Faraday rotator reflector (polarization conversion mirror) which converts the polarization state of the incoming light into the orthogonal polarization state for the reflected light, the polarization mode dispersion of the compensation line is eliminated.

The use of this dispersion compensator is appropriate when signals are transmitted over an optical fiber in one direction only. In bidirectional operation over a single optical fiber (FIG. 2), a first signal of a first wavelength band $\lambda 1$ is transmitted in one direction, and of a second signal of a second wavelength band $\lambda 2$ is transmitted in the opposite direction. The European patent application 0 658 988 teaches a compensation system from FIG. 2 and the appertaining description, which has a circulator comprising four terminals that has a compensation line for each direction of transmission.

SUMMARY OF THE INVENTION

It is the object of the invention to put forth dispersion compensators for bidirectional operation.

This object is achieved by a bidirectional dispersion compensator for a first and a second optical signal that are transmitted over an optical fiber in opposite directions, comprising:

first filter-coupler elements for merging said first optical signal, which is transmitted over a first portion of said optical fiber in a direction of said dispersion compensator, and said, counter-directional, second optical signal, which is transmitted in a direction of said dispersion compensator over a second portion of said optical fiber thereby producing merged optical signals;

a circulator having a first terminal to which said merged optical signals are fed;

a compensation line having a reflector on one side and which is connected to a second terminal of said circulator, via which said merged optical signals are sent into said compensation line and fed back into said circulator as reflected, dispersion-compensated signals; and second filter-coupler elements to which said dispersion-compensated signals that are fed to a third terminal of said circulator, said second filter-coupler elements configured for separating first and second dispersion-compensated optical signals from said dispersion-compensated signals and for feeding said first dispersion-compensated optical signal into said second portion of said optical fiber and for feeding said second dispersion-compensated optical signal into said first portion, so that said first and said second dispersion-compensated optical signals are respectively forwarded in their previous directions.

This object is also achieved by a bidirectional dispersion compensator for a first and a second optical signal which are transmitted over an optical fiber in opposite directions, comprising:

a first circulator having a first terminal to which said first optical signal is fed via a first portion of said optical fiber and a first filter-coupling element;

a second circulator having a first terminal to which said second, counter-directional, optical signal is fed via a second portion of said optical fiber and an additional filter-coupler element;

a compensation line having a reflector on one side and which is connected to a second terminal of respective said circulators via a respective terminal of a further additional filter-coupler element, by which said first and second optical signals are merged via said further additional filter-coupler element, and reflected, dispersion-compensated signals are separated, with a dispersion-compensated first signal being fed into said second terminal of said second circulator and via a third terminal of said second circulator and via said first filter-coupler element into said second portion, and with said dispersion-compensated second signal being fed into said second terminal of said first circulator and via a third terminal of said first circulator and said additional filter-coupler element into said first portion of said optical fiber, so that said two signals are respectively forwarded in their previous directions.

This object is also achieved by a bidirectional dispersion compensator for a first and a second optical signal that are transmitted over an optical fiber in opposite directions, comprising a circulator comprising a first, second, third, and fourth terminal, at whose first terminal a first optical signal that is transmitted in a direction of said dispersion compensator is fed in, and at whose third terminal a second optical signal that is transmitted in said direction of said dispersion compensator is fed in;

a filter-coupler element, which is connected to said second and fourth terminal of said circulator, said filter-coupler element having an additional terminal that conducts both optical signals;

a compensation line, which is connected to said additional terminal of said filter-coupler element and which terminates at an other end with a reflector, so that after traversing said compensation line and said filter-coupler element in said forward and reverse directions and refeeding into said circulator via said third terminal, a first dispersion-compensated optical signal and a second dispersion-compensated optical signal are fed into said optical fiber via said fourth terminal of said circulator, where said first dispersion-compensated optical signal and said second dispersion-compensated optical signal are transmitted further in their previous direction respectively.

One particularly advantageous solution is given in the independent claim 1, which requires only a single compensation line which is equipped with a reflector R to compensate both optical signals. The two optical signals are merged by filter-coupler elements and are fed into the compensation fiber via a circulator. The reflected optical signals are separated via additional filter-coupler elements and are fed into the optical fiber as dispersion compensated signals. The outlay is greater than that for a unidirectional dispersion compensator only by a few filter-coupler elements.

In order to compensate the attenuation of the dispersion compensator and the transmission paths, optical amplifiers can be inserted. If separate amplifiers are provided for both input signals and both output signals of the dispersion compensator, an individual amplification control and correction of the amplitude curve can be performed for each signal. When this is not necessary, in a development of the invention the merged input and output signals can be amplified. The amplifiers must have a larger bandwidth in this case.

In a variant of the invention that makes use of two circulators, only three filter-coupler elements are needed. In this variant, it is also advantageous when bidirectional amplifiers are arranged in the feeds to the compensation line, so that different amplifications can be set for each signal. The compensation line can then be constructed as a fiber amplifier, as well.

An embodiment that is particularly advantageous utilizes a circulator with four terminals and a filter-coupler element for merging and separating the two optical signals and requires only one compensation line.

It is also advantageous to use an additional compensation sub-line. In this way, different compensation requirements that are conditioned by the different wavelengths can be taken into account. Different reflectors can also be connected via an additional filter-coupler element.

BRIEF DESCRIPTION OF THE DRAWINGS

Exemplifying embodiments of the invention are described below with the aid of Figures.

DESCRIPTION OF THE PREFERRED EMBODIMENTS

Figure 1:
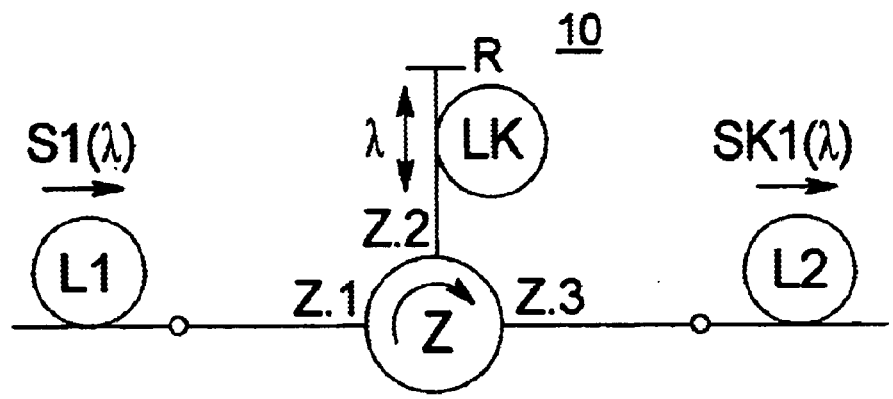
FIG. 1 is a schematic diagram of a known dispersion compensator.

The FIGS. 1 and 2 have been described above According to FIG. 2, the bidirectional dispersion compensator 1 is used for compensating optical signals S1 and S2, which are transmitted over an optical fiber L1, L2 in opposite directions. Each signal (signal band) can also consist of several individual signals, as is the case in wavelength division multiplex methods.

Figure 3:
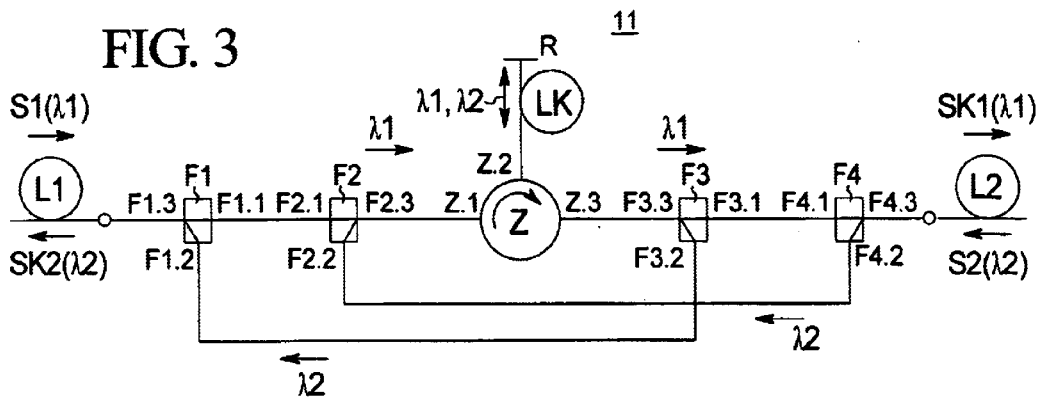
FIG. 3 is a basic circuit diagram of an inventive dispersion compensator.

The basic circuit diagram 11 represented in FIG. 3 of an inventive dispersion compensator essentially consists of a compensation line (compensation fiber) LK, a circulator Z, at whose second terminal (TOR) Z.2 one of its ends is connected, while a reflector R is arranged at the other end, and several filter-coupler elements F1 to F4, which are provided for merging and separating two optical signals S1 and S2. The optical fiber L1, L2 that serves for transmission is divided into two portions L1 and L2, between which the dispersion compensator is inserted, which is provided with opposing terminal points.

The first optical signal S1 is transmitted over the optical fiber portion L1 on the wavelength band $\lambda 1$ and reaches a first terminal Z.1 of the circulator Z via a first filter-coupler element F1 and a second filter-coupler element F2. The transmission paths of the optical signals are characterized by their wavelengths.

The second optical signal S2, which is transmitted over the optical fiber portion L2 in the opposite direction on another wavelength band $\lambda 2$, reaches the same terminal Z.1 of the circulator via a fourth filter-coupler element F4 and the second filter-coupler element F2 (an optical coupler is sufficient for this, though the term filter-coupler element is used). The two optical signals traverse the compensation line LK in the direction of the reflector, are then reflected by the reflector R, fed into the second terminal point Z.2 of the circulator, and outputted via the third terminal point Z.3. The dividing into the two wavelength bands is accomplished via a third filter-coupler element F3, via which the now dispersion-compensated first optical signal SK1 is fed into the portion L2 via the fourth filter-coupler element F4, while the compensated second optical signal SK2 is emitted in the opposite direction via the first filter coupler element F1.

The conductors that are wound in the shape of a circle symbolize conductor circuits in that the optical fiber portions L1, L2 and the compensation line LK can comprise significant lengths. The signal paths in the filter-coupler elements are indicated by lines. The filter coupler elements are components which are generally known. The reflector can be constructed in an arbitrary manner. And it is recommended to be used for compensating the polarization mode dispersion.

Figure 4:
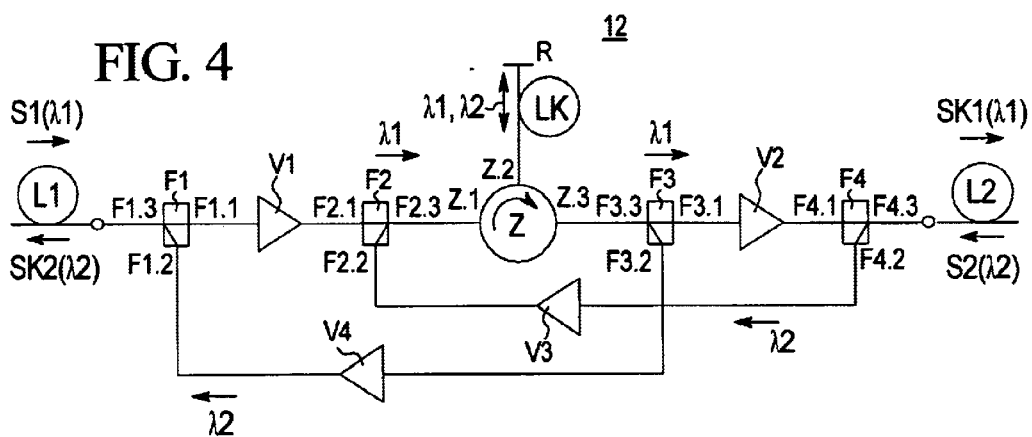
FIG. 4 is basic circuit diagram showing an inventive dispersion compensator with optical amplifiers.

FIG. 4 shows a development 12 of the dispersion compensator in which both the optical signals S1 and S2 that are fed into the compensation line and the dispersion-compensated signals SK1 and SK2 that are emitted are individually amplified. To this end, amplifiers V1 to V3 are inserted between two filter-coupler elements F1 and F2, F3 and F4, F4 and F2, F3 and F1, respectively. Not only can the attenuation of the components of the dispersion compensator be compensated, but the optical signals can also be raised to the desired level and individually amplitude-compensated.

Figure 5:
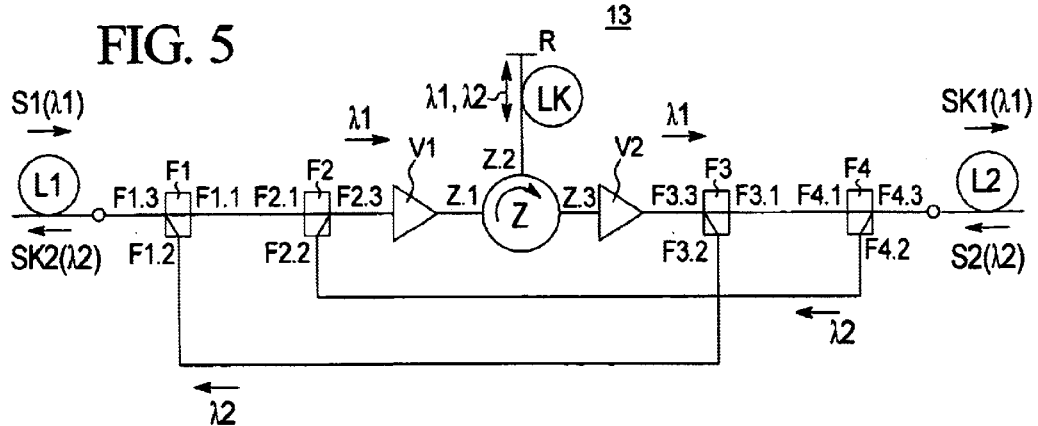
FIG. 5 is basic circuit diagram showing a variant of the dispersion compensator.

In the embodiment represented in FIG. 5, the optical signals that are fed into the circulator and those which are emitted are amplified conjointly. To this end, a first amplifier V1 is inserted between the filter-coupler element F2 and the first terminal Z.1 of the circulator Z, and a second amplifier V2 is inserted between the third terminal Z.3 of the circulator and the third filter-coupler element F3.

Figure 6:
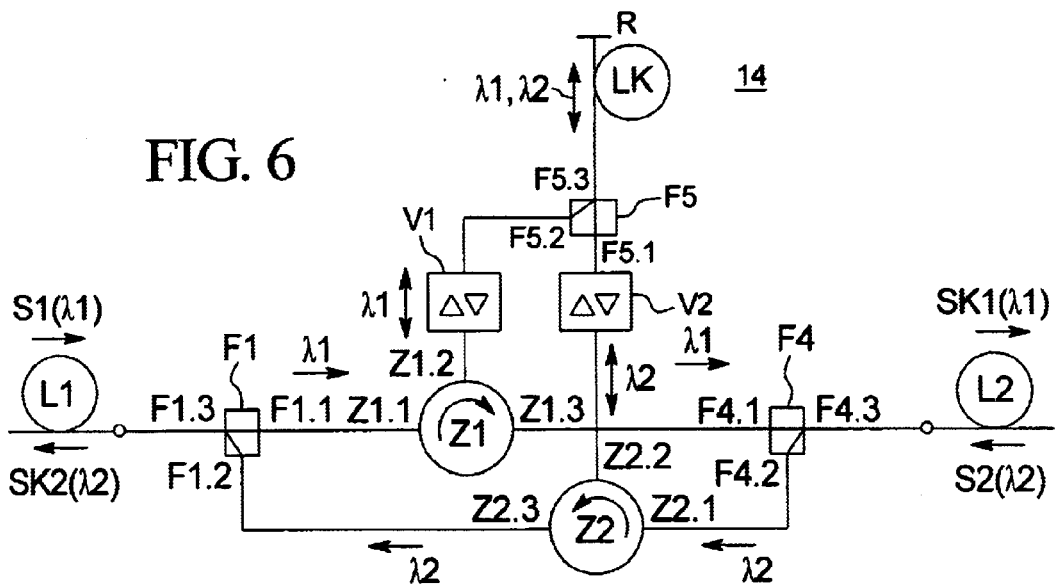
FIG. 6 is basic circuit diagram showing another embodiment having two circulators.

FIG. 6 shows an embodiment 14 of the bidirectional dispersion compensator with two circulators Z1 and Z2. The first optical signal S1 goes to the first terminal 1 of the first circulator Z1 via the first filter-coupler element F1, while the second optical signal S2 goes to the first terminal Z2.1 of the second circulator Z2 via a second filter-coupler element F2. The middle terminals Z1.2,Z2.2 of both circulators are led via optical amplifiers V1 and V2 to a further filter-coupler element F5, which element merges the two signals and feeds them into the compensation fiber LK, at the other end of which they are reflected and fed into the second terminals of the circulators via the bidirectional amplifiers (they must be permeable, at least in the reverse direction). The first dispersion-compensated optical signal SK1 is outputted at terminal Z1.3 of the first circulator Z1 and is emitted via the filter-coupler element F4. Accordingly, the compensated second optical signal SK2 is emitted by the third terminal Z2.3 of the second circulator Z2 and the first filter-coupler element F1. In this variant, it is also possible to amplify and equalize the signals that are fed in and those that are fed out separately.

Figure 2:
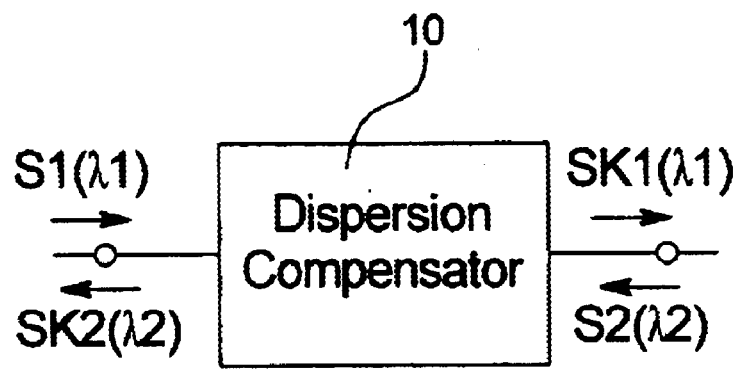
FIG. 2 is a block circuit diagram of a bidirectional dispersion compensator.
Figure 7:
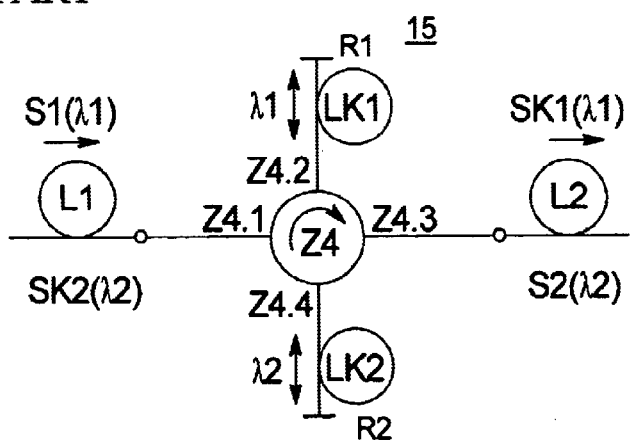
FIG. 7 is basic circuit diagram showing a known embodiment having a circulator comprising four terminals.

FIG. 7 shows an embodiment 15, as is known from EP 0685 988 A1, FIG. 2 and the appertaining specification, of a dispersion compensator in which a circulator with four terminals is used. The first optical fiber portion L1 is connected to the terminal Z4.1 and the second optical fiber L2 is connected to the terminal Z4.3 A first compensation line LK1 with its reflector R1 is connected to the second terminal Z4.2, and a second compensation fiber LK2 with its reflector R2 is connected to the fourth terminal Z4.4.

This dispersion compensator does not require a filter-coupler element. Each optical signal is regenerated in a separate compensation line. The arrangement is expedient when only short compensation lines are required.

Figure 8:
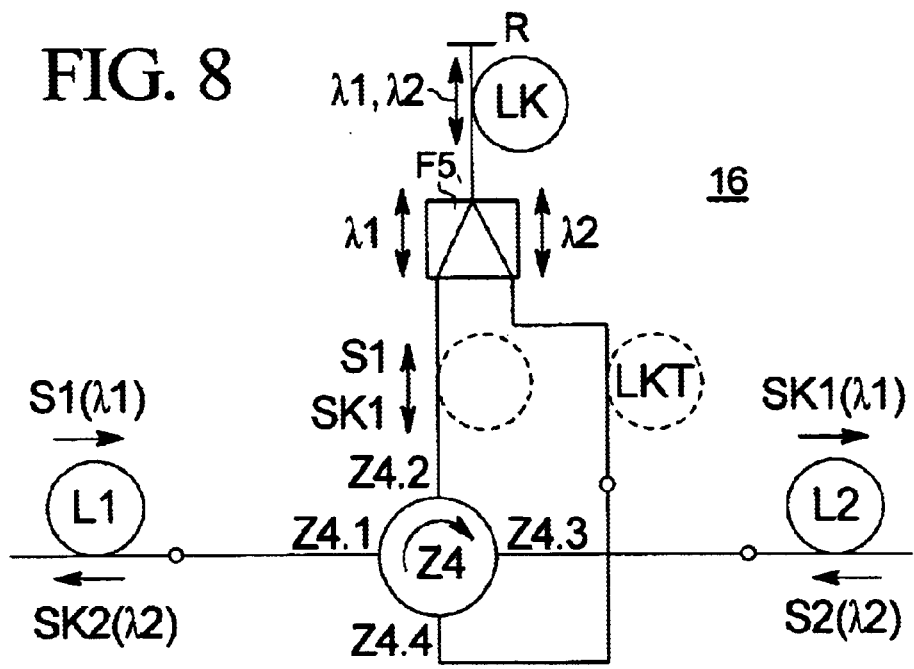
FIG. 8 is basic circuit diagram showing a particularly advantageous embodiment with this circulator.

FIG. 8 represents a particularly advantageous dispersion compensator. This likewise utilizes a circulator Z4 with four terminals; however only a single compensation line LK with reflector R is connected to the terminals Z4.2 and Z4.4 via a filter-coupler element F5. The merged optical signals S21 SK1 and S2 again traverse the compensation line together, are reflected at reflector R and fed into the same terminals of the circulator Z4 as compensated optical signals SK1 and SK2, are delivered again at the terminals Z4.3 or Z4.1, respectively, and are forwarded in the original direction.

Additionally amplifiers can be inserted for amplification and potentially for amplitude correction. Also, additional compensation sub-lines LKT can be inserted between the terminals Z4.2 and Z4.4, respectively, and the terminals of the filter-coupler element F5.

Figure 9:
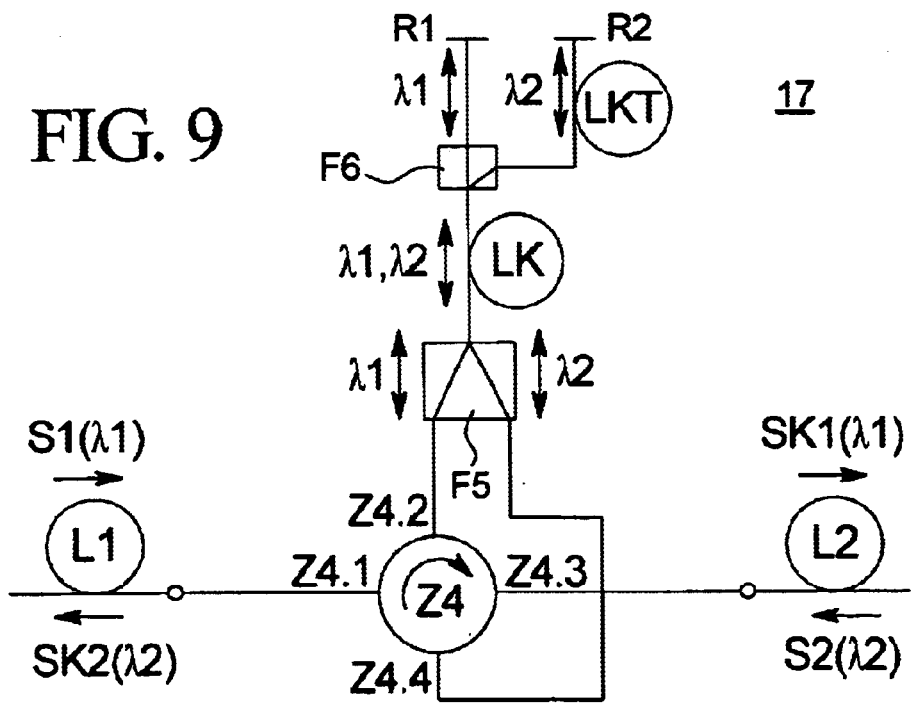
FIG. 9 is basic circuit diagram showing a variant of this embodiment with two reflectors.

The dispersion compensator represented in FIG. 9 differs from the previous embodiment by an additional filter-coupler element. It is therefore possible to use separate reflectors R1 and R2 and to connect compensation sub-fibers LKt.

The above-described dispersion compensator is illustrative of the principles of the present invention. Numerous modifications and adaptions thereof will be readily apparent to those skilled in this art without departing from the spirit and scope of the present invention.

What is claimed is:

1. A bidirectional dispersion compensator for a first and a second optical signal that are transmitted over an optical fiber in opposite directions, comprising:

first filter-coupler elements for merging said first optical signal, which is transmitted over a first position of said optical fiber in a direction of said dispersion compensator, and said counter-directional, second optical signal, which is transmitted in a direction of said dispersion compensator over a second portion of said optical fiber thereby producing merged optical signals;

a circulator having a first terminal to which said merged optical signals are fed;

a compensation line having a reflector on one side and which is connected to a second terminal of said circulator, via which said merged optical signals are sent into said compensation line and fed back into said circulator as reflected, dispersion-compensated signals; and second filter-coupler elements to which said dispersion-compensated signals that are fed to a third terminal of said circulator, said second filter-coupler elements configured for separating first and second dispersion-compensated optical signals from said dispersion-compensated signals and for feeding said first dispersion-compensated optical signal into said second portion of said optical fiber and for feeding said second dispersion-compensated optical signal into said first portion, so that said first and said second dispersion-compensated optical signals are respectively forwarded in their previous directions.

2. A bidirectional dispersion compensator as claimed in claim 1, further comprising:

a second reflector; and a dual reflector filter-coupler element via which said reflector and said second reflector are connected said compensation line.

3. A bidirectional dispersion compensator as claimed in claim 2, further comprising:

a compensation sub-line that is cut in between said compensation line and said second reflector via said dual reflector filter-coupler element.

4. A bidirectional dispersion compensator as claimed in claim 2, wherein parts of said compensation line are constructed as fiber amplifiers.

5. A bidirectional dispersion compensator as claimed in claim 4, wherein said amplifiers perform an amplitude correction.

6. A bidirectional dispersion compensator as claimed in claim 1, further comprising:

a compensation sub-line that is cut in between said circulator and said compensation line.

7. A bidirectional dispersion compensator as claimed in claim 1, further comprising:

optical amplifiers that are located in a position selected from the group consisting of between said filter-coupler elements, between said circulator and said compensation line, connected to said terminals of said circulator upstream, and connected to said terminals said circulator downstream.

8. A bidirectional dispersion compensator as claimed in claim 7, wherein said amplifiers perform an amplitude correction.

9. A bidirectional dispersion compensator for a first and a second optical signal which are transmitted over an optical fiber in opposite directions, comprising:

a first circulator having a first terminal to which said first optical signal is fed via a first portion of said optical fiber and a first filter-coupling element;

a second circulator having a first terminal to which said second, counter-directional, optical signal is fed via a second portion of said optical fiber and an additional filter-coupler element;

a compensation line having a reflector on one side and which is connected to a second terminal of respective said circulators via a respective terminal of a further additional filter-coupler element, by which said first and second optical signals are merged via said further additional filter-coupler element, and reflected, dispersion-compensated signals are separated, with a dispersion-compensated first signal being fed into said second terminal of said first circulator and via a third terminal of said first circulator and via said additional filter-coupler element into said second portion, and with said dispersion-compensated second signal being fed into said second terminal of said second circulator and via a third terminal of said second circulator and said first filter-coupler element into said first portion of said optical fiber, so that said two signals are respectively forwarded in their previous directions.

10. A bidirectional dispersion compensator as claimed in claim 9, further comprising:

a second reflector; and a dual reflector filter-coupler element via which said reflector and said second reflector are connected said compensation line.

11. A bidirectional dispersion compensator as claimed in claim 9, further comprising:

a compensation sub-line that is cut in between one of said circulators and said compensation line.

12. A bidirectional dispersion compensator as claimed in claim 9, further comprising:

optical amplifiers that are located in a position selected from the group consisting of between said filter-coupler elements, between one of said circulators and said compensation line, connected to said terminals of one of said circulators upstream, and connected to said terminals of one of said circulators downstream.

13. A bidirectional dispersion compensator for a first and a second optical signal that are transmitted over an optical fiber in opposite directions, comprising:

a circulator comprising a first, second, third, and fourth terminal, at whose first terminal a first optical signal that is transmitted in a direction of said dispersion compensator is fed in, and at whose third terminal a second optical signal that is transmitted in said direction of said dispersion compensator is fed in;

a filter-coupler element, which is connected to said second and fourth terminal of said circulator, said filter-coupler element having an additional terminal that conducts both optical signals;

a compensator line, which is connected to said additional terminal of said filter-coupler element and which terminates at an other end with a reflector, so that after traversing said compensation line and said filter-coupler element in said forward and reverse directions and refeeding into said circulator via said third terminal, a first dispersion-compensated optical signal and a second dispersion-compensated optical signal are fed into said optical fiber via said fourth terminal of said circulator, where said first dispersion-compensated optical signal and said second dispersion-compensated optical signal are transmitted further in their previous direction, respectively.

14. A bidirectional dispersion compensator as claimed in claim 13, further comprising:

a second reflector; and a dual reflector filter-coupler element via which said reflector and said second reflector are connected said compensation line.

15. A bidirectional dispersion compensator as claimed in claim 13, further comprising:

a compensation sub-line that is cut in between said circulator and said compensation line.

16. A bidirectional dispersion compensator as claimed in claim 13, further comprising:

optical amplifiers that are located in a position selected from the group consisting of between said filter-coupler elements, between said circulator and said compensation line, connected to said terminals of said circulator upstream, and connected to said terminals of said circulator downstream.

* * * * *